Patented Dec. 26, 1950

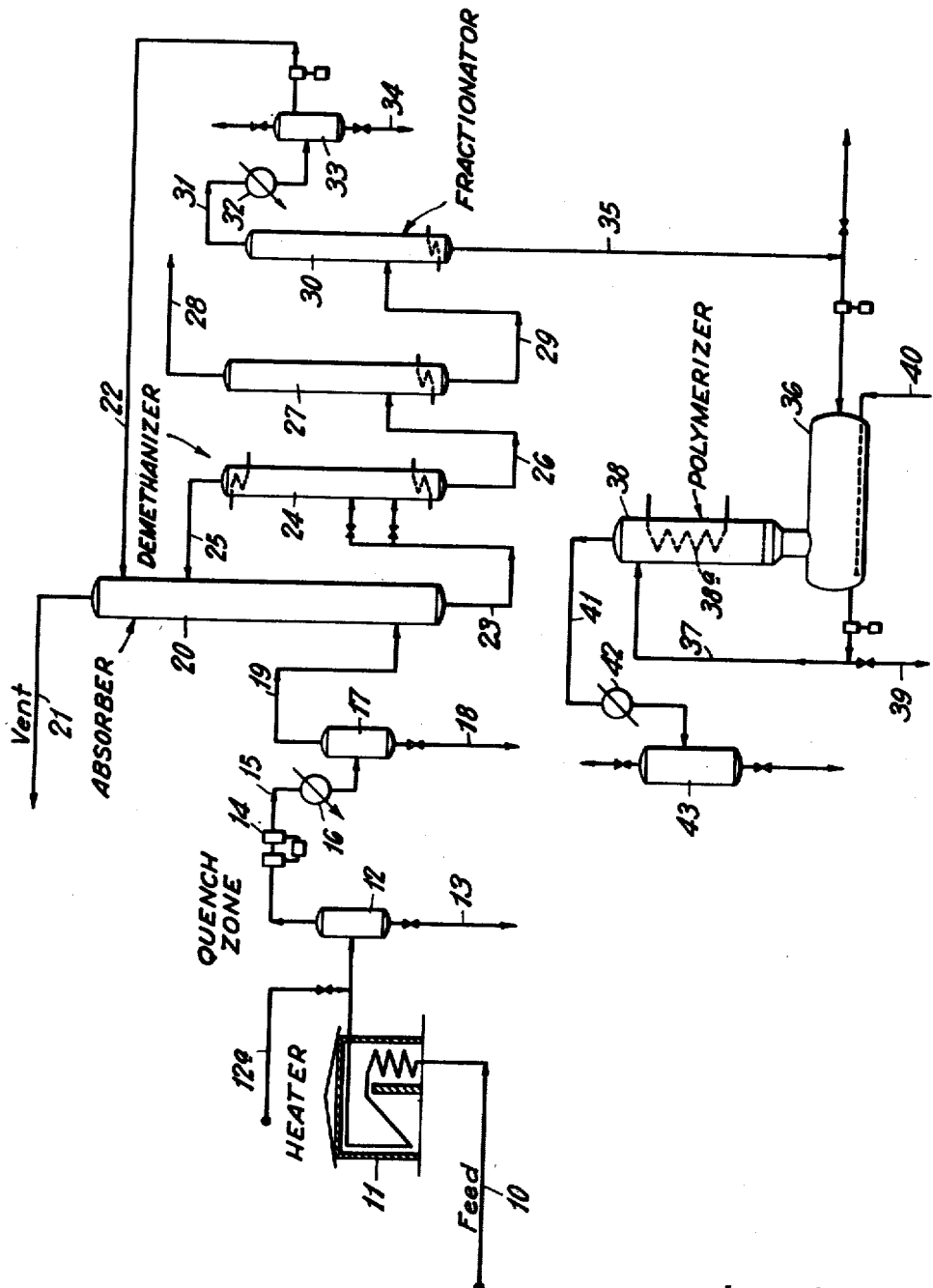

2,535,606

UNITED STATES PATENT OFFICE 2,535,606

UNSATURATED HYDROCARBON PRODUCTS AND METHOD OF MAKING SAME

Frank J. Smith, Galveston, Tex., assignor to Pan American Refining Corporation, Texas City, Tex., a corporation of Delaware Application December 27, 1946, Serial No. 718,859

3 Claims. (Cl. 260—666)

This invention relates to the manufacture of unsaturated hydrocarbons by the pyrolysis of hydrocarbon gases, particularly propane. The invention also relates to the manufacture of unsaturated hydrocarbon resins and oils as well as the polymerization of unsaturated distillates obtained by hydrocarbon gas pyrolysis.

My invention is illustrated by a drawing which shows diagrammatically the gas pyrolysis step of the process. The unsaturated hydrocarbons which form the subject of this invention are produced in conjunction with the production of butadiene and in conjunction with the production of other olefins by high temperature cracking processes. Referring to the drawing, hydrocarbon gas, preferably propane or a mixture of propane and propylene, is injected by line 10 into tube furnace 11 where it is heated rapidly to a high temperature preferably in the range of about 1350 to 1550° F. but at least 1300° F., and at a pressure of approximately atmospheric. It is preferred to employ a furnace with chrome alloy tubes of small diameter and heat the gas at a high space velocity.

The hot gases emerging from the furnace pass directly into a quenching zone 12 wherein cold water from line 12a is injected to chill the gases and prevent further pyrolytic reaction, polymerization, etc. The temperature in the quench zone is usually reduced to about 100° F. A heavy quench distillate and quench water are withdrawn by line 13. From the quencher the gases are conducted to compressors 14 where the pressure is stepped up to about 500 p. s. i. From the compressors the gas is conducted by line 15 to cooler 16 and thence to separator 17 where heavy condensate is withdrawn by valved line 18. The amount of condensate withdrawn at 18 is controlled by the amount of cooling supplied at 16 and the resulting temperature in 17. By maintaining the temperature in 17 at 250° F. only a small amount of heavy hydrocarbon condensate is separated to be withdrawn at 18.

The gases next flow thru line 19 to absorber 20 where they flow upwardly countercurrent to a stream of absorber oil and the unabsorbed gases pass out by line 21. The absorber oil is a liquid fraction condensed in the process itself. It is supplied to the top of the absorber by line 22, preferably at room temperature or slightly above, e. g. 100 to 150° F. The pressure in absorber 20 is maintained at about 500 p. s. i., e. g. in the range of 350 to 700 p. s. i.

The absorption product, i. e. the "fat oil," is withdrawn from the absorber by line 23 leading to demethanizing tower 24 wherein it is stripped of methane and any residual hydrogen, these gases being ejected by line 25 leading to an intermediate point in absorber 20. The demethanized products then flow by line 26 to depropanizer 27 where the $C_2$ and $C_3$ hydrocarbons are eliminated by fractionation and withdrawn as vapor by line 28. These products can be further fractionated by means not shown for the recovery of ethylene, the remaining gases, primarily ethane and propane, being recycled to pyrolysis furnace 11.

The depropanized absorber oil is now conducted by line 29 to fractionator 30 where a light fraction comprised principally of $C_4$–$C_6$ hydrocarbons is withdrawn by line 31, condensed in 32, and collected in absorber oil supply tank 33, whence a stream is pumped by line 22 back to the upper part of absorber tower 20. A portion of the stock in tank 33 may be withdrawn by line 34 as desired.

The stock withdrawn by line 35 from the bottom of fractionator 30 is a highly unsaturated oil having approximately the following composition:

| | |
|---|---:|
| Refractive Index ($N_D^{25}$) | 1.5031 |
| Density ($D_4^{25}$) | 0.9296 |
| Bromine number (Francis) | 152 |
| Iodine number (Wijs) | 276 |
| Gravity, °A. P. I. | 20.1 |
| Distillation range, °F.: | |
| Initial | 270 |
| 10% | 304 |
| 20% | 320 |
| 30% | 336 |
| 40% | 356 |
| 50% | 380 |
| 60% | 442 |
| 70% | 482 |
| 80% | 500 |
| 90% | 630 |
| Final boiling point | 698 |

Unsaturated oil obtained according to the hereinabove described cracking was polymerized by heating in a bomb for forty-eight hours at 500° F. The pressure increased during the operation from 120 to 140 p. s. i. g. The resulting product had the following characteristics:

| | |
|---|---:|
| Refractive index ($N_D^{25}$) | 1.527 |
| Density ($D_4^{25}$) | 0.9745 |
| Bromine number (Francis) | 112 |
| Iodine number (Wijs) | 230 |

Higher temperatures in the treatment were avoided to avoid thermal decomposition.

I have found that if the non-polymerizable fractions of the unsaturated oil in line 35 are removed by stripping off the lower boiling portion of the oil, the residue can be thermally polymerized at atmospheric pressure or pressures only slightly above atmospheric.

It was also found that the rate of polymerization of the unsaturated oil could be materially increased by the use of polymerization catalysts well known in the art such as Friedel-Crafts type catalysts, acid type catalysts and particularly catalysts of the active clay type. The catalyst in granular form can be maintained in a bed or tower and the unsaturated oil passed thru it to effect the desired polymerization. As an example of this method of operation, the drawing shows line 35 leading to polymerization still 36 wherein the oil is maintained hot by the application of heat from the furnace and recycled thru line 37 to the top of tower 38 in which the catalyst, e. g. Attapulgus clay, is maintained in a bed. Exothermic heat of the reaction may be removed by means of coolant circulated through coils 28a. The oil becomes polymerised in passing downwardly thru the clay and the product is finally drawn off either continuously or intermittently at 39. Steam may be injected into the still by line 40 and vaporized products removed by line 41. Although I have described the polymerization reactor as a catalyst packed tower, I do not wish to be limited to this type of reactor. For example, I may use other types of polymerization reactors such as, for example, a pot type reactor which is suitably equipped with agitating means to obtain contact of the reactants with the catalyst.

In one run the following results were obtained: 150 barrels of unsaturated oil from tower 30 was charged to the still 36 and recirculated for ninety-six hours thru 2500 pounds of Attapulgus clay catalyst. The temperature of the still was held at about 465 to 490° F. The still pressure being under 3 p. s. i. g., the rate of circulation thru the catalyst was 65 barrels per hour. A small stream of steam was injected constantly during the run. The product obtained had the following characteristics:

Gravity, °A. P. I_____ 7.6 (1.0114 sp. gr. D₄²⁵)
Color, A. S. T. M_____ 4
Viscosity, Saybolt Universal at 210° F_____ 971
Iodine number_____ 190
Refractive index N_D²⁵__ 1.5449
Nonvolatile matter, percent_____ 95.8

From 370 barrels of charge, there was obtained 130 barrels of the polymerized product. This product possesses good drying properties and can be reduced by distillation to any desired viscosity, giving a solid, light colored, highly unsaturated resin. I have obtained by the above process highly viscous products having iodine numbers of 200 or higher and an A. S. T. M. color of less than 2. The viscous oil obtained at an intermediate stage in polymerization is suitable as a linseed oil extender, tung oil substitute, resin substitute for use in finishes, enamel for the inside of food containers, tinned cans, etc., for use in printing ink compositions, core oils, caulking compounds, etc., and wherever a heavy drying oil is desirable. On drying, a tough adherent film is obtained. The unsaturated polymers may also be sulfurized to yield lubricating oil additive products containing sulfur, particularly valuable in gear lubricants and extreme pressure lubricants in general. Such viscous intermediate oil may also be reacted with acid anhydrides and the product can be condensed with polyols to form resins, varnish vehicles and enamel vehicles.

A portion of the unsaturated oil from the bottom of fractionator 30 was distilled and 60% of it was collected as a distillate and redistilled in a Hyper-Cal fractionating column. The fraction collected between 36 and 63 per cent possessed a substantially constant boiling point of about 318 to 319° F. The total amount of this stock was about 22% charged to the fractionator or about 13.2% of the total unsaturated oil from tower 30. The middle cut of this constant boiling material was refractionated in a Hyper-Cal column and yielded a product having the following composition:

Boiling Point, °F_____318.3
Refractive index, (N_D²⁵)_____1.494
Density 25.6/4_____0.9154
Bromine No. (Francis)_____234

A molecular weight determination gave a value of 120 from which it was determined that the hydrocarbon contained nine carbon atoms. The bromine number of 234 corresponds to 1.8 mols of bromine per mol of hydrocarbon. Allowing 0.2 mol for experimental error, this indicates the hydrocarbon contains two double bonds. A study of the literature indicates that the new compounds is a bicyclic diene derivative, namely dihydrohydrindene or bicyclononadiene. A sample of it was hydrogenated and compared with hydrindane whose properties are known.

Following is the result of the comparison:

|  | Hydrindane | Hydrogenated Unknown |
| --- | --- | --- |
| Density—Hydrindane | .875 at 23° C | 0.871 at 27° C. |
| Refractive Index | 1.4689 at 24.9° C | 1.4678 at 25.5° C. |
| Boiling Point | 165 to 166° C | 165° C. |

It is therefore established that the new unsaturated nonane hydrocarbon is dihydrohydrindene, although the position of the two double bonds in the molecule has not been established.

The dihydrohydrindene obtained by my process was condensed with maleic anhydride to give an acid anhydride condensation product. On condensation with glycol, glycerine, pentaerythritol, etc., varnishes, enamel vehicles and thermosetting resins can be obtained. On hydrolysis of the maleic anhydride condensation product and condensation of the resulting dibasic acid with dihydrohydrindene diglycol, a thermosetting resin was obtained. Esterification of the dibasic acid with various alcohols, e. g. butyl alcohol, yields valuable plasticizers. This new product can also be chlorinated to obtain a new class of insecticides.

Having thus described my invention what I claim is:

1. The method of making an unsaturated hydrocarbon drying oil having an iodine number of about 190 to 230 and a refractive index (N_D²⁵) of about 1.525 to 1.550 which comprises subjecting to pyrolysis at a temperature of at least 1300° F. a hydrocarbon gas having at least two carbon atoms selected from the class consisting of paraffins and olefins, quenching the pyrolysis products to prevent polymerization reactions, compressing the gaseous reaction products to a pressure of at least 350 p. s. i., absorbing condensable hydrocarbons from the gaseous products in a light absorption oil at said pressure, removing propane and lighter hydrocarbons from the absorption products, distilling light liquid pyrolysis products and said absorption oil from the heavier pryolysis products, further fractionating the heavier pyrolysis products into an unsaturated oil fraction consisting essentially of hydrocarbons having at least nine carbon atoms, and polymerizing said unsaturated oil fraction to produce said drying oil.

2. The method of claim 1 wherein said hydrocarbon gas is propane.

3. A hydrocarbon drying oil characterized by a refractive index ($N_D^{25}$) of about 1.525 to 1.550, a density ($D_4^{25}$) of about .9745 to 1.0114, a color less than 4 A. S. T. M. and a high iodine number of about 190 to 230 prepared by the pyrolysis at a temperature of at least 1300° F. of hydrocarbon gas having two to four carbon atoms selected from the class consisting of paraffins and olefins, quenching the pyrolysis products to avoid polymerization reactions, recovering condensable hydrocarbons from the reaction products and separating therefrom an unsaturated oil fraction about nine carbon atoms and polymerizing said sunsaturated oil fraction to produce said drying oil.

FRANK J. SMITH.

REFERENCES CITED

The following references are of record in the file of this patent:

UNITED STATES PATENTS

| Number | Name | Date |
| --- | --- | --- |
| 2,092,889 | Mikeska et al. | Sept. 14, 1937 |
| 2,211,248 | Wagner | Aug. 13, 1940 |
| 2,388,947 | Bibb et al. | Nov. 13, 1945 |
| 2,391,555 | deSimo et al. | Dec. 25, 1945 |
| 2,412,096 | Odell | Dec. 3, 1946 |

OTHER REFERENCES

C. A., vol. 19 (1925), page 1262, Zelinskii et al., "0,3.4-bicyclononane catalysis."